May 28, 1968

W. K. MONG ET AL 3,385,638

FLUID PRESSURE BRAKE CONTROL APPARATUS WITH
MANUAL BRAKE CYLINDER RELEASE

Filed Jan. 31, 1967

INVENTOR.
WILLIAM K. MONG
GLENN T. McCLURE
BY
*A.A. Steinmiller*
ATTORNEY

INVENTOR.
WILLIAM K. MONG
GLENN T. McCLURE
BY
*A. A. Steinmiller*
ATTORNEY

United States Patent Office 3,385,638
Patented May 28, 1968

3,385,638
FLUID PRESSURE BRAKE CONTROL APPARATUS
WITH MANUAL BRAKE CYLINDER RELEASE
William K. Mong, Irwin, and Glenn T. McClure, McKeesport, Pa., assignors to Westinghouse Air Brake Company, Wilmerding, Pa., a corporation of Pennsylvania
Filed Jan. 31, 1967, Ser. No. 613,013
7 Claims. (Cl. 303—69)

ABSTRACT OF THE DISCLOSURE

A brake cylinder pressure release valve device, for interposition between a control valve device and a brake cylinder device, operation of which effects release of pressure from the brake cylinder without reduction of pressure in the auxiliary reservoir and which is restored automatically to a position in which fluid pressure may be resupplied to the brake cylinder by restoration of the control valve device to its brake release position. The pressure release valve device comprises a manually operated pilot valve which operates to release pressure from the brake cylinder as long as it is held open. If the brake cylinder supply pressure from the control valve exceeds a certain pressure at the time the pilot valve is opened, a main cut-off and release valve controlled by the pilot valve locks in brake cylinder venting position enabling the pilot valve to be returned to its normal closed position.

---

A brake cylinder pressure release valve device, for interposition between a control valve device and a brake cylinder device, operation of which effects release of pressure from the brake cylinder without reduction of pressure in the auxiliary reservoir and which is restored automatically by increase in brake cylinder pressure to a position in which fluid pressure may be resupplied to the brake cylinder.

Brake cylinder release valve devices have heretofore been proposed comprising a release valve, the initial manual movement of which valve will cause an unrestricted venting of fluid under pressure from one side of a movable abutment operatively connected to the release valve and a restricted or throttled venting of fluid under pressure from the opposite side of the abutment to thereby establish a fluid pressure differential force which is effective to move the release valve to a position to close communication between a brake control valve device and a brake cylinder device and to establish a communication between the brake cylinder device and atmosphere, thereby releasing the brake without bleeding of fluid pressure from the auxiliary reservoir. This restricted or throttled venting of fluid under pressure from the opposite side of the abutment is provided by one or more ports provided in a bushing in which the valve operates and by the clearance between the interior wall surface of the bushing and the peripheral surface of the release valve slidably mounted in the bushing. Therefore, this restricted or throttled venting of fluid under pressure varies with the degree of accuracy of machining obtained when manufacturing the bushing and valve and increases as the wear of these members of the brake cylinder release valve device occurs. Consequently, the positiveness of operation and the time of operation of this type of brake cylinder release valve device varies with the length of time the valve device has been in service.

Accordingly, it is the general purpose of this invention to provide a brake cylinder release valve device which is so constructed that it is uniformly positive in operation and the time of operation of which does not vary with variations in accuracy of machining operations incidental to manufacture and with the length of time the valve device is in service.

According to this invention, a brake cylinder release valve device is provided which embodies a movable abutment and two spring biased check valves one of which is coaxial with a valve stem movable at one time with respect to the abutment and at another time by the abutment away from the one check valve to cause the closing thereof when the other check valve is manually unseated to cause venting of fluid under pressure from one side of the abutment supplied thereto via a choke of fixed size thereby rendering fluid under pressure active on the opposite side of the abutment effective to deflect this abutment in the direction to cause seating of the one check valve. The valve stem has formed thereon two spaced-apart portions of reduced diameter one of which constitutes an exhaust valve for controlling flow of fluid under pressure from the brake cylinder device to atmosphere and the other of which constitutes a valve for releasing fluid under pressure from the opposite side of the abutment to atmosphere when the pressure on the opposite side is reduced to a chosen pressure as a result of, for example, leakage thereby causing deflection of the diaphragm relative to the valve stem to establish a release communication via the two portions of reduced diameter in series. This arrangement insures that it is only necessary for the other check valve to be manually unseated for a uniform short length of time to always provide for proper operation of the brake cylinder release valve device to effect a complete release of the brakes on a railway car.

Figure 1:
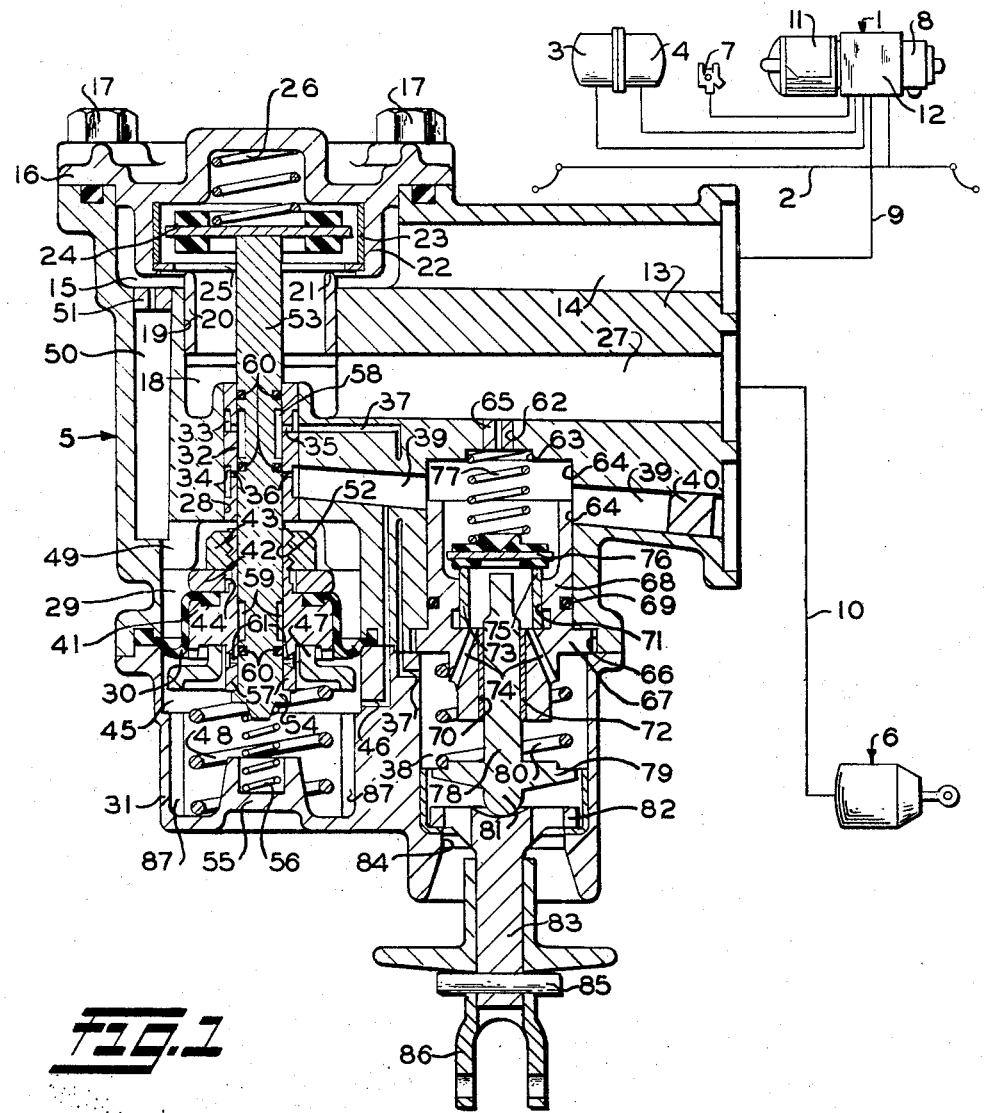
FIG. 1 is a diagrammatic view showing a railway freight car brake equipment embodying a novel brake cylinder release valve device shown in enlarged cross-section.

Referring to FIG. 1 of the drawings, the railway freight car brake equipment embodying the invention comprises a brake control valve device 1 to which is connected the usual brake pipe 2, auxiliary reservoir 3, emergency reservoir 4 and a novel brake cylinder pressure release valve device 5 constituting the present invention, which release valve device 5 in turn is connected to the usual brake cylinder device 6, and a retaining valve device 7.

The brake control valve device 1 may be the same as that shown and described in United States Patent 2,031,-213 issued Feb. 18, 1936 to Clyde C. Farmer and assigned to the assignee of the present application. Since reference may be had to the patent, a detailed description of this brake control valve device is believed to be unnecessary.

Briefly, however, the brake control valve device 1 comprises a service portion 8 adapted to operate upon both a service and an emergency rate of reduction in pressure of fluid in brake pipe 2 for supplying fluid under pressure from the auxiliary reservoir 3 to the brake cylinder pipe 9 and thence via the brake cylinder pressure release valve device 5 and a pipe 10 to the brake cylinder device 6, for effecting a service application of the brakes on a railway freight car. The brake control valve device 1 also comprises an emergency portion 11 which is adapted to operate only upon an emergency rate of reduction of pressure of fluid in the brake pipe 2 for effecting the supply of fluid under pressure from the emergency reservoir 4 to pipe 9 and thence via the brake cylinder pressure release valve device 5 and the pipe 10 to the brake cylinder device 6, wherein such pressure acts in assistance of that provided from the auxiliary reservoir 3 by operation of the service portion 8, to operate the brake cylinder device 6 for effecting an emergency application of the brakes on the freight car. Upon recharging of the brake pipe 2, the brake control valve device 1 is adapted to operate to open pipe 9 to atmosphere for releasing fluid under pressure therefrom and from the brake cylinder device 6 via the pipe 10 and brake cylinder pressure release valve device 5 for releasing the brakes on the railway freight car and at the same time to effect recharging of the auxiliary reservoir 3 and the emergency reservoir 4 in the usual well-known manner. The service portion 8 and the emergency portion 11, respectively, of the brake control valve device 1 are mounted on the opposite faces of a pipe bracket 12 to which all pipe connections to the valve device 1 are made, as shown in FIG. 1 of the drawings.

The manually operated brake cylinder pressure release valve device 5 shown in FIG. 1 of the drawings comprises a casing 13 that has a first passageway 14 extending therethrough to one end of which is connected the hereinbefore-mentioned brake cylinder pipe 9. The opposite end of the passageway 14 opens into a first chamber 15 formed by the cooperative relationship of the casing 13 and a cup-shaped cover member 16 secured to the casing 13 by a plurality of cap screws 17 two of which appear in FIG. 1 of the drawings.

The casing 13 has formed therein below the first chamber 15 a second chamber 18 which is connected to the first chamber 15 by a bore 19 into which is received, as by a press fit, a bushing 20 that has an annular valve seat 21 provided on the upper end thereof which is disposed in the first chamber 15.

As shown in FIG. 1, the cover member 16 is provided with a downwardly extending skirt portion 22 in which is disposed a bushing 23 that is cast integral with this skirt portion. A flat disc-type valve 24 is disposed in the bushing 23 and is retained therein by a snap ring 25 that is inserted in a groove formed in the interior wall of the skirt portion 22.

Interposed between the cover member 16 and the valve 24 is a spring 26 which is effective to bias the valve 24 toward the valve seat 21.

The casing 13 is provided therein with a second passageway 27 that is disposed below and parallel to the hereinbefore-mentioned passageway 14 in this casing. One end of the passageway 27 opens into the hereinbefore-mentioned second chamber 18 in the casing 13 and the opposite end of this passageway 27 has connected thereto one end of the pipe 10 that has its opposite end connected to the brake cylinder device 6.

The casing 13 is further provided with a second bore 28 coaxial with the first bore 19. One end of this bore 28 opens into the second chamber 18 and the opposite end opens into a third chamber 29 formed by the cooperative relationship of the casing 13 and a diaphragm or abutment 30 the outer periphery of which is clamped between the casing 13 and a bottom cover member 31 that is secured to the bottom of the casing 13 by any suitable means (not shown).

Press-fitted into the bore 28 is a bushing 32 on the periphery of which is formed two spaced-apart elongated annular grooves 33 and 34. The groove 33 is connected to the interior of the bushing 32 by a plurality of arcuately spaced ports 35 two of which appear in FIGS. 1, 2 and 3 of the drawings. Likewise, the groove 34 is connected to the interior of the bushing 32 by a plurality of arcuately spaced ports 36 two of which appear in FIGS. 1, 2 and 3.

Extending through the casing 13 and bottom cover member 31 is a third passageway 37 one end of which opens at the wall surface of the bore 28 at such a location as to be in alignment with the upper groove 33 on the bushing 32. The opposite end of the passageway 37 opens into a third chamber 38 formed by the cooperative relationship between the casing 13 and the bottom cover member 31.

Extending through the casing 13 is a fourth passageway 39 one end of which opens at the wall surface of the bore 28 at such a location as to be in alignment with the lower groove 34 on the bushing 32. The opposite end of this passageway opens to the exterior of the casing 13 and is closed by a plug 40.

The inner periphery of the hereinbefore-mentioned diaphragm 30 is clamped between a diaphragm follower 41 and a diaphragm follower plate 42 by a nut 43 that has screw-threaded engagement with a threaded portion of the diaphragm follower 41 located at the upper side thereof and extending through a bore 44 in the follower plate 42.

The diaphragm 30 and the bottom cover member 31 cooperate to form on the lower side of this diaphragm a fourth chamber 45 into which opens one end of a fifth passageway 46 that extends through the bottom cover member 31 and the casing 13 and at its opposite end opens into the hereinbefore-mentioned fourth passageway 39 intermediate the ends thereof.

Disposed in the chamber 45 and resting against the lower side of the diaphragm follower plate 41 is an annular cup-shaped spring seat 47 between which and the bottom cover member 31 is interposed a spring 48. This spring 48 is effective, in the absence of fluid under pressure in the chambers 29 and 45, to bias the upper side of the diaphragm follower plate 42 against a plurality of arcuately spaced inwardly extending ribs 49 formed integral with the casing 13 and projecting into the chamber 29 which is supplied with fluid under pressure from the chamber 15 via a sixth passageway 50 extending through the casing section 13 and having therein at its upper end, as shown in FIG. 1, a choke 51.

The diaphragm follower 41 is provided with a bore 52 through which and the bushing 32 slidably extends a valve operating stem 53 that has formed adjacent its lower end a collar 54. Interposed between this collar 54 and a spring seat 55 formed integral with the bottom cover member 31 is a spring 56 which is effective, while the spring 48 biases the diaphragm follower plate 42 against the ribs 49, as shown in FIG. 1, to bias the collar 54 against the lower end of a hollow cylindrical member 57 that is formed integral with the diaphragm follower 41. It will be noted that the length of stem 53 is such that, while the spring 48 biases the diaphragm follower plate 42 against the ribs 49 and the spring 56 biases the collar 54 against the lower end of the hollow cylindrical member 57, as shown in FIG. 1 of the drawings, the upper end of this stem 53 maintains the valve 24 unseated from its seat 21 to thereby establish a communication between the chambers 15 and 18 via the bushing 20.

The valve operating stem 53 is provided with two spaced-apart elongated peripheral annular grooves 58 and 59. Adjacent each end of the elongated peripheral annular groove 58 and adjacent the lower end of the elongated peripheral annular groove 59 the stem 53 is provided with a peripheral annular groove in which is disposed an O-ring 60. These O-rings 60 form a seal respectively with the wall surface of the bushing 32 and the wall surface of the bore 52 extending through the diaphragm follower 41 and the hollow cylindrical member 57 that is integral therewith. This member 57 is provided with a plurality of arcuately spaced short passageways 61 which, while the stem 53 occupies the position shown in FIG. 1, open at one end at the wall surface of the bore 52 below the location at which the lowermost O-ring 60 carried by the stem 53 forms a seal with the wall surface of the bore 52, and at the opposite end on the peripheral surface of the hollow cylindrical member 57.

As shown in FIG. 1 of the drawings, the casing 13 is provided with a bore 62 which at one end opens into the hereinbefore-mentioned passageway 27 in this casing 13 and at the opposite end opens into a first coaxial counterbore 63 that in turn opens into a second coaxial counterbore 64 that intersects the hereinbefore-mentioned passageway 39 intermediate the ends thereof. A choke 65 is press-fitted into the bore 62, the size of the choke 65 being greater than the size of choke 51 for a reason hereinafter made apparent.

The casing 13 is provided with a third counterbore 66 that is coaxial with the hereinbefore-mentioned counterbores 63 and 64. A collar 67 formed intermediate the ends of a cylindrical member 68 that is cup-shaped at its upper end and is mounted in the counterbore 64 is disposed in the counterbore 66 so as to be clamped between the casing 13 and the bottom cover member 31 secured thereto. The cylindrical member 68 is provided with a peripheral annular groove in which is disposed an O-ring 69 that forms a seal with the wall surface of the counterbore 64 to prevent leakage of fluid under pressure from the passageway 39 to atmosphere between the peripheral surface of member 68 and the wall surface of the counterbore 64.

The cylindrical member 68 is provided with a bore 70 and a coaxial counterbore 71 that opens into the cup-shaped upper end thereof. A wear bushing 72 is press-fitted into the bore 70 and a second bushing 73 is press-fitted into the counterbore 71 so that the lower end of this bushing 73 is disposed in surrounding relation to the upper end of a plurality of bores 74 extending obliquely through the cylindrical member 68 and opening at the exterior surface thereof. The upper end of the bushing 73 extends into the cup-shaped upper end of the cylindrical member 68 and constitutes an annular valve seat 75 against which a flat disc-type valve 76 is normally biased by a spring 77 that is interposed between the upper side of this valve and the upper end of the counterbore 63.

Slidably mounted in the wear bushing 72 is an operating stem 78 that has formed integral therewith at its lower end a collar 79 between which and the collar 67 is disposed in surrounding relation to the stem 78 a spring 80 that is effective to normally bias the stem 78 to the position shown in FIG. 1 of the drawings in which position a central boss 81 formed on the lower side of the collar 79 abuts the center of a flange 82 that is integral with the upper end of a manually operated release valve stem 83 that extends through a bore 84 in the bottom cover member 31. The lower end of the manually operated release valve stem 83 has secured thereto, as by a pin 85, a clevis 86 the jaws of which may be operatively connected to pull rods (not shown) which extend to each side of the freight car.

*Operation*

When a railway freight car is detached from a train for humping operations, the brake pipe 2 is completely vented to atmosphere. This complete venting of the brake pipe 2 to atmosphere, at the time a car is detached from a train for humping operations, is effective to cause the brake control valve device 1 to effect an emergency application of the brakes on the detached car. When an emergency brake application is thus effected, the brake control valve device 1 operates to effect the supply of fluid under pressure from both the auxiliary reservoir 3 and the emergency reservoir 4 to the pipe 9 from whence it flows to the brake cylinder device 6 via the passageway 14, chamber 15, past unseated valve 24, bushing 20, chamber 18, passageway 27 and pipe 10. Fluid under pressure will thus flow from the auxiliary reservoir 3 and the emergency reservoir 4 to the brake cylinder device 6 until equalization of pressure in these reservoirs and the brake cylinder device 6 occurs.

Some of the fluid under pressure supplied to the chamber 15 in the manner described above flows therefrom to the chamber 29 above the diaphragm 30 via the choke 51 and passageway 50. Also, some of the fluid under pressure supplied to the passageway 27 flows therefrom to the chamber 45 below the diaphragm 30 via the choke 65, counterbores 63 and 64, passageway 39, and passageway 46. Since the size of the choke 65 exceeds the size of the choke 51, as afore stated, it will be apparent that the pressure in the chamber 45 will increase more rapidly than the pressure in the chamber 29. Consequently, the diaphragm 30, diaphragm follower 41, diaphragm follower plate 42 and valve stem 53 remain in the position shown in FIG. 1 in which the stem 53 maintains valve 24 unseated from its seat 21.

Assume now that a trainman desires to effect a complete release of the emergency application of the brakes on the detached car. To do so, the trainman will exert a pull on one of the pull rods secured to the clevis 86 connected to the manually operated release valve stem 83 so as to effect tilting of this stem 83 about the periphery of its flange 82 so that the central boss 81 is effective to move the operating stem 78 upward far enough, against the yielding resistance of the spring 80, for this stem 78 to unseat the valve 76 against the yielding resistance of the spring 77 from the valve seat 75.

When the valve 76 is thus unseated from its seat 75, fluid under pressure flows at an unrestricted rate from the chamber 45 below the diaphragm 30 to atmosphere via passageways 46 and 39, past unseated valve 76, bushing 73, bores 74, chamber 38 and bore 84.

Simultaneously fluid under pressure flows at a restricted rate determined by the size of the choke 51 from the chamber 29 above the diaphragm 30 to atmosphere via passageway 50, choke 51, chamber 15, past unseated valve 24, bushing 20, chamber 18, passageway 27, choke 65, counterbores 63 and 64, past unseated valve 76, bushing 73, bores 74, chamber 38 and bore 84.

Furthermore, fluid under pressure is at this time flowing from the brake cylinder device 6 to atmosphere via pipe 10, passageway 27, choke 65, counterbores 63 and 64, past unseated valve 76 and the pathway traced above.

As fluid under pressure is now flowing from the chamber 45 below the diaphragm 30 at a more rapid rate than fluid under pressure is flowing from the chamber 29 above this diaphragm, it is apparent that a differential of pressure will be quickly established on the opposite sides of this diaphragm 30 to deflect it in a downward direction against the yielding resistance of spring 48 from the position shown in FIG. 1 to the position shown in FIG. 2 in which the periphery of the cup-shaped spring seat 47 abuts a plurality of arcuately arranged ribs 87 that are integral with the bottom cover member 31 and extend into the chamber 45.

As the diaphragm 30 is thus deflected downward, the diaphragm follower 41 having integral therewith the hollow cylindrical member 57, the diaphragm follower plate 42 and the nut 43 are simultaneously moved downward. This downward movement of the cylindrical member 57 is transmitted to the stem 53 via the collar 54 that is integral with this stem. Accordingly, the stem 53 is likewise moved downward against the yielding resistance of spring 56 until the cup-shaped spring seat 47 abuts the ribs 87.

The Association of American Railroads adopted, effective Aug. 1, 1962, a specification for brake cylinder release valves for freight brake equipment which states:

"The brake cylinder release valve (a) must permit the further flow of air from the auxiliary and emergency reservoirs to the brake cylinder or cylinders if at the time of its actuation the brake cylinder pressure, under a partial service application, is 30 p.s.i. or less; and (b) must prevent the further flow of air from the auxiliary and emergency reservoirs to the brake cylinder or cylinders, if the time of its actuation the brake cylinder pressure is 40 p.s.i. or higher."

Figure 2:
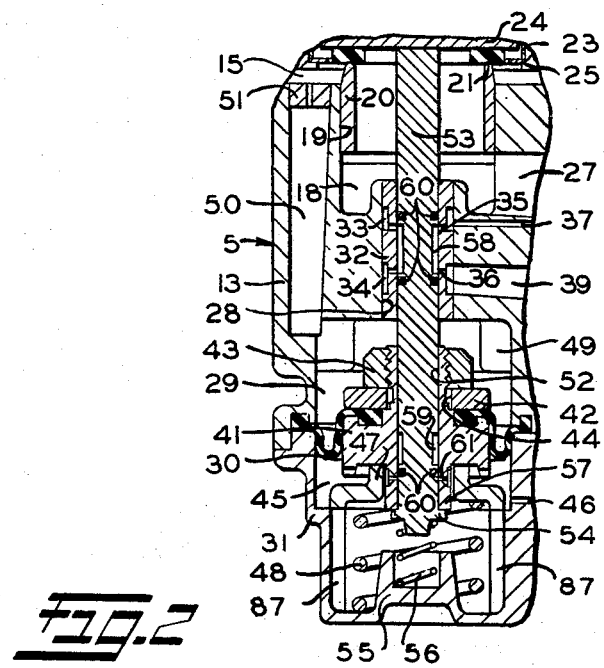
FIG. 2 is a fragmentary view of the valve operating stem and the diaphragm shown in FIG. 1, showing these elements in a second position.

Accordingly, in order to conform to the above quoted specification, the combined strength of the springs 48 and 56 must be such that the stem 53 will be moved to the position shown in FIG. 2 only when the brake cylinder pressure present in the chamber 29 above the diaphragm 30 is forty pounds per square inch or higher.

As the stem 53 is moved downward in the manner just explained, the spring 26 is rendered effective to move the valve 24 downward until it rests on its valve seat 21, as shown in FIG. 2, to thereby close communication between chambers 15 and 18.

When the valve 24 is moved into seating contact with its seat 21, flow of fluid under pressure from the chamber 29 to atmosphere via the pathway hereinbefore traced is cut off. It will be noted that the auxiliary reservoir 3 and emergency reservoir 4 are now connected to the chamber 29 via the brake control valve device 1 that at this time is in its emergency position, pipe 9, passageway 14, chamber 15, choke 51 and passageway 50. Therefore, the hereinbefore-mentioned pressure of forty pounds per square inch or higher is present in the chamber 29 to maintain the diaphragm 30, diaphragm follower 41, diaphragm follower plate 42 and stem 53 in the position shown in FIG. 2 so long as fluid under pressure present in the auxiliary reservoir 3 and emergency reservoir 4 is forty pounds per square inch.

When the valve stem 53 is moved to the position shown in FIG. 2 and the valve 24 is seated on its seat 21 to close communications between the brake control valve device 1 and the brake cylinder device 5, this brake cylinder device 5 is connected to the atmosphere via pipe 10, passageway 27, choke 65, counterbores 63 and 64, passageway 39, elongated peripheral annular groove 34 on bushing 32, ports 36 in this bushing 32, elongated peripheral annular groove 58 on stem 53, ports 35 in the bushing 32, elongated peripheral annular groove 33 on this bushing 32, passageway 37, chamber 38 (FIG. 1), and bore 84. From the above it is apparent that the trainman only has to exert a momentary pull on one of the pull rods attached to the clevis 86 to effect movement of the operating stem 78 to its upper position in which it effects unseating of the valve 76 from its seat 75 to cause the stem 53 to be moved to its lower position and maintained in this position whereupon fluid under pressure will be completely vented from the brake cylinder device 5 to atmosphere subsequent to the trainman releasing his pull on the pull rod secured to the clevis 86 and the reseating of the valve 76 on its seat 75 by the spring 77. When fluid under pressure is thus completely released from the brake cylinder device 6, the brakes on the car are completely released.

Let it be assumed that while the detached freight car is setting on a siding subsequent to effecting a manual operation of the brake cylinder pressure release valve device 5 to cause a complete release of fluid under pressure from the brake cylinder device 6 in the manner explained above, the pressure in the pipe 9, passageway 14, chamber 15, passageway 50 and chamber 29 above the diaphragm 30 is reduced as the result of leakage from the auxiliary reservoir 3 and the emergency reservoir 4 to a chosen value which may be, for example, twenty-four pounds per square inch which corresponds to the strength of the spring 48.

Figure 3:
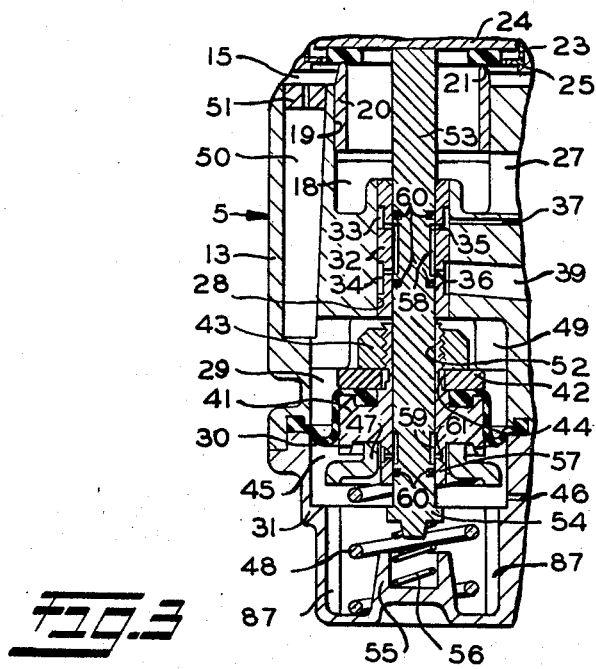
FIG. 3 is a fragmentary view, showing the diaphragm returned to the position shown in FIG. 1 and the valve operating stem in the same position as shown in FIG. 2.

As the pressure in the chamber 29 is thus further reduced, the spring 48 is rendered effective to move the spring seat 47, diaphragm follower 41 and hollow cylindrical member 57 integral therewith, diaphragm 30, diaphragm follower plate 42 and nut 43 upward from the position shown in FIG. 2 to the position shown in FIG. 3.

The strength of the spring 56 is such that so long as a chosen pressure of, for example, five pounds per square inch, is present in the chamber 15 and acting on the upper side of the valve 24 over an equal area within the annular valve seat 21, this spring 56 cannot move the stem 53 upward from the position shown in FIG. 3.

Therefore, as the spring 48 moves the spring seat 47, diaphragm follower 41 and hollow cylindrical member 57 integral therewith, diaphragm 30, diaphragm follower plate 42, and nut 43 upward in response to the reduction in pressure in the chamber 29, as the result of leakage or some other cause, from the position shown in FIG. 2 to the position shown in FIG. 3, this movement is relative to the now stationary stem 53. Consequently, it can be seen from FIGS. 2 and 3 that the short passageways 61 in the hollow cylindrical member 57 are moved from a position below the O-ring 60 (FIG. 2) carried by the stem 53 adjacent the lower end of the elongated peripheral annular groove 59 to a position above this O-ring 60 (FIG. 3).

When short passageways 61 in the hollow cylindrical member 57 are moved to a position above the O-ring 60 carried by the stem 53 adjacent the lower end of the elongated peripheral annular groove 59, as shown in FIG. 3, the fluid under pressure present in the chamber 29 above the diaphragm 30 will flow to the chamber 45 below this diaphragm via the clearance space between the peripheral surface of the stem 53 and the wall surface of the bore 52 in the diaphragm follower 41, the elongated peripheral annular groove 59 on the stem 53, and the plurality of short passageways 61 in the hollow cylindrical member 57. Fluid under pressure thus supplied to the chamber 45 from the chamber 29 will flow to atmosphere via passageways 46 and 39, ports 36, elongated peripheral annular groove 58, ports 35, groove 33, passageway 37, chamber 38 and bore 84.

Since the chamber 29 is connected to the chamber 15 via the passageway 50 and choke 51, and the chamber 15 is connected to the auxiliary reservoir 3 and emergency reservoir 4 via passageway 14, pipe 9 and the brake control valve device 1 now in its emergency position, fluid under pressure will flow from the auxiliary reservoir 3 and emergency reservoir 4 to the chamber 29 and thence to atmosphere via the pathway traced above until the pressure in these reservoirs and the chamber 15 is reduced to the hereinbefore-mentioned chosen value of five pounds per square inch.

As the pressure in chamber 15 and acting on the upper side of the valve 24 over an area equal to the area of annular valve seat 21 is reduced by flow to atmosphere, via the pathway described above, below five pounds per square inch, the spring 56 is rendered effective to move the stem 53 upward to effect unseating of valve 24 from its seat 21 and to move the O-ring 60 carried by the stem 53 adjacent the lower end of the elongated groove 59 on this stem 53 from the position shown in FIG. 3 in which this O-ring 60 is below the short passageway 61 in hollow cylindrical member 57 to the position shown in FIG. 1 in which this O-ring is above these short passageways 61 to thereby cut off further flow of fluid under pressure from the auxiliary reservoir 3 and emergency reservoir 4 to atmosphere.

When valve 24 is unseated in the manner just explained, fluid at a low pressure of less than five pounds per square inch will again flow to the brake cylinder device 6. However, since this brake cylinder device 6 is provided with a comparatively strong release spring (not shown), the low pressure fluid supplied to the brake cylinder device 6 upon unseating of the valve 24 from its seat 21 in the manner just explained, will not cause a brake application for the reason that this low pressure fluid is unable to move the brake cylinder piston (not shown) from its release position against the yielding resistance of the release spring.

The purpose of venting fluid under pressure from the auxiliary reservoir 3 and the emergency reservoir 4 to atmosphere in the manner explained above, upon the pressure in these reservoirs and the chamber 29 being reduced, as the result of leakage or some other cause, to the above-mentioned chosen value of twenty-four pounds per square inch, until the pressure in these reservoirs is reduced to, for example, slightly below five pounds per square inch, is to prevent a possible injury to a workman.

It will be understood that if a railway freight car is taken out of revenue service for repairs, such as, for example, replacing worn out brake shoes with new brake shoes, the car may be set off on a side track and remain there several days before actual repair work is begun. During this time fluid under pressure may leak from the auxiliary reservoir 3 and the emergency reservoir 4 and such leakage would continue subsequent to the beginning of the repair work. Therefore, if the pressure in the auxiliary reservoir 3, the emergency reservoir 4, and the chambers 15 and 29 were the above-mentioned value of twenty-four pounds per square inch at the time the valve 24 is unseated from its seat 21, the fluid supplied to the brake cylinder device 6, upon unseating this valve 24, would cause the brake cylinder piston to move from its release position against the yielding resistance of the release spring to an application position thereby moving the brake shoe into contact with the tread surface of the corresponding wheel. Accordingly, it will be apparent that should a workman be in the process of changing brake shoes at the time this brake application occurred, there is the possibility that he may receive an injury at this time. By venting fluid under pressure from the auxiliary reservoir 3, the emergency reservoir 4 and the chambers 15 and 29 to atmosphere until the pressure therein is reduced to the above-mentioned value of less than five pounds per square inch before effecting the unseating of the valve 24 from its seat 21 to cause the supply of fluid under pressure to the brake cylinder device 6 at this low pressure, prevents the possibilty of injury to a workman as the result of this supply of fluid under pressure to the brake cylinder device 6.

Let it be supposed that a partial service brake application has been effected in which the brake control valve device 1 effects the supply of fluid under pressure from the auxiliary reservoir 3 to the chambers 15 and 29 and the brake cylinder device 6 until the pressure therein is increased to some value less than forty pounds per square inch. Since the pressure supplied to the chamber 29 is less than forty pounds per square inch, this pressure is insufficient to deflect the diaphragm 30 downward against the combined resistance of the springs 48 and 56. Accordingly, the stem 53 remains in the position shown in FIG. 1 of the drawings in which this stem maintains the valve 24 unseated from its seat 21 thereby maintaining open the communication between the brake control valve device 1 now in its service lap position and the brake cylinder device 6.

Let it now be assummed that a trainman desires to effect a release of fluid under pressure from the brake cylinder device 6 to reduce the degree of the brake application or to completely release all of the fluid under pressure in the brake cylinder device 6. To do so, he will exert a pull on one of the pull rods secured to the clevis 86 connected to the manually operated release valve stem 83 so as to effect tilting of this stem 83 about the periphery of its flange 82 to effect unseating of the valve 76 from its seat 75 in the manner hereinbefore explained in detail.

When the valve 76 is thus unseated from its seat 75, fluid under pressure flows from the brake cylinder device 6 to atmosphere via pipe 10, passageway 27, choke 65, counterbores 63 and 64, past unseated valve 75, bushing 73, bore 74, chamber 38, and bore 84. Fluid under pressure can thus be vented from the brake cylinder device 6 to atmosphere so long as the trainman maintains the valve 75 unseated from its seat 75 by exerting a pull on the pull rod secured to the clevis 86. Accordingly, the trainman will thus maintain the valve 76 unseated from its seat 75 until the pressure in the brake cylinder device 6 is reduced to the desired degree or is completely vented to atmosphere.

From the foregoing, it is apparent that the brake cylinder pressure release valve device 5 conforms to the hereinbefore-mentioned specification of the Association of American Railroads in that it permits "the further flow of air from the auxiliary and emergency reservoirs to the brake cylinder or cylinders if at the time of its actuation the brake cylinder pressure, under a partial service application, is 30 p.s.i. or less," and prevents "the further flow of air from the auxiliary and emergency reservoirs to the brake cylinder or cylinders, if at the time of its actuation the brake cylinder pressure is 40 p.s.i. or higher."

Having now described the invention, what we claim as new and desire to secure by Letters Patent is:

1. A brake cylinder pressure release valve device for interposition in a fluid pressure supply communication between a fluid pressure operated brake control valve device and a brake cylinder device of a fluid pressure brake system, said brake cylinder pressure release valve device comprising:
   (a) a casing,
   (b) valve means in said casing having a normal position in which it opens the fluid pressure supply communication, and a closed position in which it closes the fluid pressure supply communication, said valve means in its closed position being subject to the supply pressure in said communication,
   (c) bias means exerting a force on one side of said valve means to bias it toward said closed position,
   (d) a double-acting fluid motor,
   (e) a first choke on the upstream side of said valve means constantly connecting the fluid pressure supply communication to one side of said double-acting fluid motor,
   (f) a second choke on the downstream side of said valve means connnecting the fluid pressure supply communication to the other side of said double-acting fluid motor when the said valve means is in its normal position,
   (g) a stem slidably mounted in a bore in said casing and having a lost-motion connection with said fluid motor, said stem being moved by said fluid motor in one direction to render said bias means effective to cause said valve means to be moved to its closed position,
   (h) manually operable valve means for simultaneously effecting a release of fluid under pressure from the respective opposite sides of said fluid motor at two different rates, the lesser rate occurring from one side of the fluid motor via said two chokes in series, and the greater rate of release occurring from the opposite side of said fluid motor in by-pass of said two chokes, said manually operable valve means also effecting the release of fluid under pressure from the brake cylinder device at a third rate via only the said second choke, the differential fluid pressure force thus created on said one side of said fluid motor causing said fluid motor to effect movement of said stem in said one direction from a first position in which said stem holds said valve means in its normal position to a second position in which said bias means is rendered effective to cause said valve means to be moved to its closed position,
   (i) a first valve operative by the lost motion between said fluid motor and said stem from a first position to a second position upon movement of said fluid motor with respect to said stem in a direction opposite said one direction in response to a chosen reduction in said differential fluid pressure force on said one side of said fluid motor to open a fluid pressure communication between the said one and said opposite sides of said fluid motor,
   (j) a second valve operative upon movement of said stem to its said second position to establish a communication between the said opposite side of said fluid motor and atmosphere whereby subsequent to said first valve opening the fluid pressure communication between the said one and said opposite sides of said fluid motor, fluid under pressure is completely vented from both sides of said motor and also from the portion of the fluid pressure communication upstream of said valve means, and (k) a spring interposed between said casing and one end of said stem and effective via said stem to move said valve means from its closed position to its normal position to reopen the fluid pressure supply communication between the brake control valve device and the brake cylinder device.

2. A brake cylinder pressure release valve device, as claimed in claim 1, further characterized by a second spring cooperating with said spring to jointly yieldingly resist movement of said fluid motor in said one direction, said second spring being independently effective to cause movement of said fluid motor in said opposite direction relative to said stem in response to said chosen reduction in pressure on said one side thereof, whereby said valve means remains closed until fluid under pressure is substantially completely vented from said one side of said fluid motor.

3. A brake cylinder pressure release valve device, as claimed in claim 1, further characterized in that said stem is provided adjacent said one end with a collar and an O-ring seal on one side thereof and in that said first valve comprises:
  (a) a sleeve carried by said fluid motor in non-sealable surrounding relation to said stem on the same side of said collar as said seal, said sleeve being provided with a plurality of arcuately arranged ports extending radially therethrough whereby, upon movement of said sleeve relative to said stem in a direction opposite said one direction responsive to said chosen reduction in pressure on said one side of said fluid motor as a result of leakage of fluid under pressure from the supply communication from a position in which said ports are between said seal and said collar to a position in which said seal is between said ports and said collar, said fluid pressure communication between the opposite sides of said fluid motor is established.

4. A brake cylinder pressure release valve device, as claimed in claim 1, further characterized in that said casing is provided with a pair of passageways one of which at one end opens to the other side of said fluid motor and one end of the other of which opens to atmosphere, the other end of each of said passageways opening at the wall surface of the bore in said casing one spaced from the other, and in that second valve comprises an elongated peripheral annular groove in said stem having an O-ring seal disposed adjacent each end thereof and carried by said stem, said groove, upon movement of said stem in said one direction from its said first position to its said second position, connecting the other ends of said passageway whereupon fluid under pressure is released from the other side of said fluid motor to atmosphere.

5. A brake cylinder pressure release valve device, as claimed in claim 4, further characterized in that said one passageway has a restricted communication via said second choke with the brake cylinder device whereby fluid under pressure is released at a restricted rate from the brake cylinder device to atmosphere simultaneously as fluid under pressure is released at an unrestricted rate from the other side of said fluid motor to atmosphere by operation of said manually operable valve means.

6. A brake cylinder pressure release value device, as claimed in claim 1, further characterized by:
  (a) a chamber in said casing communicating with the portion of said fluid pressure supply communication downstream of said valve means via said second choke,
  (b) a passageway communicating said opposite side of the fluid motor with said chamber,
  (c) a valve member spring-biased to a seated position closing communication between said chamber and atmosphere, and
  (d) a manually operated plunger means operable to unseat said valve member to simultaneously vent said opposite side of said fluid motor at an unrestricted rate and the brake cylinder device at a restricted rate.

7. A brake cylinder pressure release valve device, as claimed in claim 1, further characterized in that said manually operable valve means comprises:
  (a) an annular valve seat,
  (b) a valve member,
  (c) a spring for biasing said valve into seating contact with said seat,
  (d) a plunger slidably mounted for movement into contact with said valve member to effect the unseating thereof,
  (e) manually operable means for effecting movement of said plunger for effecting unseating of said valve member from said seat, and
  (f) biasing means effective to move said plunger in the direction away from said valve member to render said spring effective to seat said valve member.

References Cited
UNITED STATES PATENTS 3,001,833   9/1961   Kirk _____ 303—68
3,117,823   1/1964   Pickert _____ 303—69

DUANE A. REGER, *Primary Examiner.*

J. J. McLAUGHLIN, *Assistant Examiner.*